(12) United States Patent
Krefta et al.

(10) Patent No.: US 6,952,086 B1
(45) Date of Patent: Oct. 4, 2005

(54) LINEAR POSITION SENSING SYSTEM AND COIL SWITCHING METHODS FOR CLOSED-LOOP CONTROL OF LARGE LINEAR INDUCTION MOTOR SYSTEMS

(75) Inventors: Mark Peter Krefta, Murrysville, PA (US); David Jonathan Hall, Pittsburgh, PA (US); Kenneth Martin Eichler, Murrysville, PA (US); Jiing-Liang Wu, Murrysville, PA (US); Robert E. Strickler, Pittsburgh, PA (US); Michael Barnaby Brennen, Pittsburgh, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 159 days.

(21) Appl. No.: 10/683,964

(22) Filed: Oct. 10, 2003

(51) Int. Cl.$^7$ .......................................... H02K 41/00
(52) U.S. Cl. ................................. 318/135; 310/12
(58) Field of Search ................................. 310/12–14

(56) References Cited

U.S. PATENT DOCUMENTS

| | | | |
|---|---|---|---|
| 2,406,381 A | 8/1946 | Jones et al. .................. 290/17 |
| 2,412,511 A | 12/1946 | Jones ........................ 310/13 |
| 3,721,874 A | 3/1973 | Palenc et al. ............... 318/135 |
| 3,904,941 A | 9/1975 | Matsui et al. ............... 318/135 |
| 3,906,262 A | 9/1975 | Shichida et al. ............. 310/12 |
| 4,014,015 A | 3/1977 | Gundlach .................... 341/10 |
| 4,068,152 A | 1/1978 | Nakamura et al. ........... 318/135 |
| 4,454,457 A | 6/1984 | Nakamura et al. ........... 318/135 |
| 4,595,870 A | 6/1986 | Chitayat .................... 318/687 |
| 4,723,103 A | 2/1988 | Gilgen ....................... 318/687 |
| 4,767,954 A | 8/1988 | Phillips ...................... 310/12 |
| 4,795,113 A * | 1/1989 | Minovitch ................... 244/63 |
| 4,926,741 A * | 5/1990 | Zabar ........................ 89/8 |
| 4,928,572 A | 5/1990 | Scott et al. ................... 89/8 |
| RE33,314 E | 8/1990 | Cowles ....................... 318/98 |
| 4,973,892 A | 11/1990 | Murata et al. ............... 318/135 |
| 5,003,260 A | 3/1991 | Auchterlonie .............. 324/207.16 |
| 5,064,998 A | 11/1991 | Holling ...................... 219/519 |
| 5,136,217 A | 8/1992 | Hoffmann et al. ........... 318/135 |
| 5,207,304 A | 5/1993 | Lechne et al. ............... 191/10 |
| 5,302,872 A | 4/1994 | Ohki et al. .................. 310/12 |
| 5,433,155 A | 7/1995 | O'Neill et al. .............. 104/282 |
| 5,467,718 A | 11/1995 | Shibata et al. .............. 104/284 |
| 5,598,044 A * | 1/1997 | Satomi et al. ............... 310/12 |
| 5,668,421 A | 9/1997 | Gladish ..................... 310/12 |
| 5,808,537 A | 9/1998 | Kondo et al. ............... 336/233 |

(Continued)

OTHER PUBLICATIONS

Doyle et al., Electromagnetic Aircraft Launch System—EMALS, IEE Transactions on Magnetics, vol. 31, No. 1, pp. 528-533, 1995.

(Continued)

*Primary Examiner*—Darren Schuberg
*Assistant Examiner*—Judson H. Jones
(74) *Attorney, Agent, or Firm*—Reed Smith LLP

(57) ABSTRACT

A control system for a linear motor adapted to accurately supply a moving window of power to the stator coils. A plurality of individually switched stator coils run the length of a linear motor to move a rotor down the long axis of the stator. Accurate inductive-based position sensors continuously provide position data for the moving rotor. A processing unit calculates a proper time delay from a source voltage peak in order to apply power to the next stator coil in the moving direction of the rotor such that no DC offshoot/undershoot occurs. The linear motor control system optionally includes a failure prevention switching scheme in which pairs of individual stator coils on opposite sides of a double-sided stator are switched together.

20 Claims, 8 Drawing Sheets

U.S. PATENT DOCUMENTS

| | | | |
|---|---|---|---|
| 5,815,091 A | 9/1998 | Dames et al. | 340/870.34 |
| 5,880,514 A | 3/1999 | Nagatomo | 257/546 |
| 5,941,353 A | 8/1999 | Minoshima et al. | 191/10 |
| 6,007,022 A | 12/1999 | Stallard, III | 244/63 |
| 6,011,508 A | 1/2000 | Perreault et al. | 342/350 |
| 6,060,881 A | 5/2000 | Dilger et al. | 324/207.22 |
| 6,333,628 B1 | 12/2001 | Yeh et al. | 310/12 X |
| 6,815,847 B2 * | 11/2004 | Duncan et al. | 310/12 |
| 6,825,631 B1 * | 11/2004 | Nakamura | 318/560 |

OTHER PUBLICATIONS

Doyle et al., The Benefits of Electromagnetically Launching Aircraft, Naval Engineers Journal, pp. 77-82, 2000.

* cited by examiner

LINEAR POSITION SENSING SYSTEM AND COIL SWITCHING METHODS FOR CLOSED-LOOP CONTROL OF LARGE LINEAR INDUCTION MOTOR SYSTEMS

BACKGROUND OF THE INVENTION

1. Field of the Invention

The present invention relates generally to linear induction motors, and, more specifically, the present invention relates to the control of large linear induction motor systems including inductive-based position sensing and stator coil switching algorithms.

2. Description of the Background

Linear induction motors are increasingly being designed for a wide variety of applications from moving loads to launching aircraft. For example, linear induction motors may be used for conveyor systems, material handling, transportation (people movers and trains), projectile accelerators and launchers, and machine tool operations. Large linear induction motors may even be used to launch aircraft from aircraft carriers, and very large "magnetic lifters" are being developed to launch payloads into space. Other applications of linear induction motors include: elevators for aircraft carriers and other locations; conveyors/package handling equipment; torpedo launching systems; and vertical launching systems.

Linear induction motors generally fall into two categories: (1) short primary and (2) short secondary machines. In the case of short primary motors (FIG. 1), the excitation is supplied by a small section of the motor (the primary or stator 105) that moves past a relatively long reaction rail or plate (the secondary or rotor 110). The interaction of the applied currents through windings 115 embedded in slots in the stator 105 and the induced currents in the rotor 110 produce the motor force. As the coils 115 are energized, the stator 105 moves along a track or rail down the length of the rotor 110. Both single-sided (FIG. 1A) and double-sided (FIG. 1B) configurations are possible.

The short secondary motor (FIG. 2), on the other hand, uses a relatively short moving member to act as the reaction rail or plate (secondary or rotor 120) while the excitation is supplied from a relatively long stator 125. The accelerating force acting on the rotor 120 is again due to the interaction of the applied currents in the stator windings 130 and the induced rotor reaction currents. In this case, it is the rotor 120 which is accelerated along a track down the long axis of the stator 125. Again, the short secondary linear motors can be either single-sided (FIG. 2A) or double-sided (FIG. 2B).

In many applications, such as the aircraft launcher, the linear induction motor is characterized by a very long stator or guide rail through which the rotor (also referred to in such orientations as the "runner") travels down the track. Such a system must be designed to accelerate the aircraft (which can weigh thousands of pounds) to very high speeds in a relatively short distance. As such, the control systems for these large linear induction motors—including stator coil switching and runner position sensing and control—must be designed to maximize performance.

FIG. 3 shows one common method for exciting the windings 130 in the stator 125 in a short secondary linear induction motor. In this approach, current is applied to the entire length of the stator 125 through the embedded stator windings 130. However, this is typically not an effective approach for large linear induction motors because power transfer to the rotor or runner plate 120 only occurs over a small section of the stator 125 (adjacent to the instantaneous position of the runner 120). The rest of the length of the stator 125 acts like a parasitic inductor storing magnetic energy and heating the stator 125 as a result of coil resistive losses.

In addition to the negative impacts on the motor, this approach also requires a larger sizing of the power inverter supplying the electrical energy to the motor. For large accelerator applications such as aircraft or space payload launching (high acceleration of massive objects), exciting the entire stator may require so much electric power that the system becomes infeasible. Consequently, alternative means of exciting the stator local to the region at which the runner exists as it moves along the stator are of interest for this type of motor.

Further, when large linear motors are used, the position of the moving rotor or runner must be accurately sensed and controlled in order to maximize the thrust, conserve power and reduce friction. Even small (~ millimeters) fluctuations must be compensated. The control system of the linear motor must also be able to compensate for or limit the effect of certain failure conditions, for example when some of the stator windings on one side of a double-sided linear motor fail—causing a magnetic imbalance laterally in the motor.

As such, the present invention, in at least one preferred embodiment, addresses one or more of the above-described and other limitations to prior art linear motor induction systems. The invention preferably includes: systems and methods for appropriately providing current to the stator windings in a long linear induction motor; systems and methods for sensing and controlling the position of a moving rotor in a linear motor; as well as systems and methods for avoiding or limiting certain failure conditions in linear motor systems.

SUMMARY OF THE INVENTION

In accordance with at least one preferred embodiment, the present invention provides systems and methods for controlling linear induction motors. Specifically, the present invention includes control circuits for selectively switching stator coils, position sensing circuits for providing precise rotor positioning data, and failure prevention systems for negating the potentially adverse affects for coil switch failure.

In large linear induction motors, such as those used to launch aircraft, a runner plate (rotor) travels lengthwise down the axis of a long linear stator with embedded coils. Because of power considerations, especially aboard an aircraft carrier, the present invention provides for a coil selection and switching algorithm to "window" the travelling runner plate and provide only power which is useful for propelling the runner. Further, the coil switch timing is adapted to fire at precise moments when adverse transient currents may be avoided.

Further, the present invention includes systems and methods for precisely sensing and identifying runner (rotor) position as it travel down the length of the stator. Specifically, a combination of inductive-based sensors and Hall-effect sensors are used to identify both relative and absolute positioning of the runner plate. To accommodate the position sensing system, a specialized support structure including both fixed and loosely-coupled structures is employed.

Finally, the present invention also optionally includes adapted switch design for the stator coil section which "pairs" opposing coils in a dual-stator linear induction motor. By switching the stator coils in pairs in this way, and therefore reducing the number of switches by half, potentially damaging lateral forces called by switch failure can be avoided.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

The following detailed description includes various systems and methods for controlling a large linear induction motor to maximize its performance. In order to illustrate one potential application of the inventive aspects, an aircraft launching system is illustrated. However, the concepts described herein may be expanded to cover a wide variety of linear induction motors, especially when available power is limited and the linear induction motor is large. Each of the following concepts (i.e., stator switching, position sensing, and failure compensation) can be optionally used in combination or alone.

Stator Switching

Figure 4:
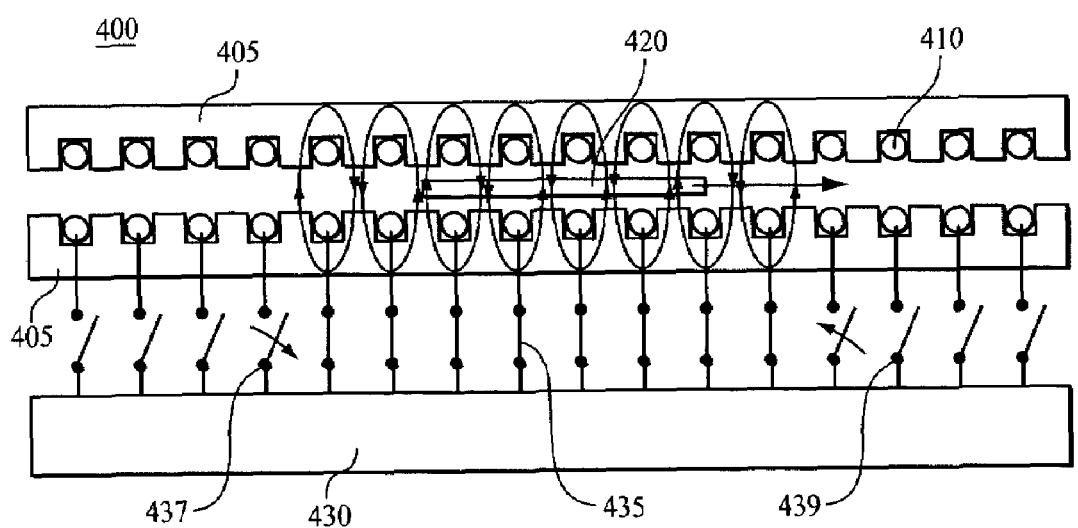
FIG. 4 depicts a short secondary linear motor with moving excitation field energized by coil switches.

As a first linear motor control solution, the invention described herein deals specifically with a method of exciting the short secondary induction motor locally in the region where the reaction plate exists. In effect, the invention provides a method of producing a "window" of magnetic excitation that covers the runner plate at all times, but does not provide excitation to coils outside the runner plate region. This is accomplished by switching on and off individual coils 410 as the runner plate (rotor) 420 moves down the stator 405 as shown in FIG. 4.

A specialized position sensing system (described below) is used to accurately monitor the position of the runner plate 420 relative to the stator 405. Decisions are made as to which stator coils 410 should be turned off or on based on the runner plate 420 position information. As the runner 420 moves to the right, "leading" stator coils are switched on by closing switches 439 connected to power source 430 and "trailing" stator coils are switched off by opening switches 437. The result of this is an excitation "window" (defined by closed switches 435) that moves with the runner plate 420. The plate 420 is kept fully covered regardless of the runner plate location or direction of motion.

One feature of the present switching scheme is to control the leading and trailing edges of the moving current window so as to limit distortions in the traveling magnetic field wave over the runner plate. Specifically, the electrical transients associated with "turning on" of the coil switches is preferably minimized. Fundamentally, it is well established in the motor arts that the sudden application of an AC voltage to a coil produces an exponentially decaying component of current in addition to the desired sinusoidal steady-state component. This exponentially decaying current component results in a stationary magnetic field component which, in turn, produces an electromagnetic drag force acting on the runner plate. Since the drag force opposes the main steady-state electromagnetic thrust, it will have a detrimental impact on motor performance.

The fact that there exist substantial current transients when voltage is suddenly applied to a coil rules out the use of standard group or block switching approaches for large linear motors. That is, if a group of three coils is suddenly turned on near the leading edge of the runner plate (rotor), a large current transient will occur, producing a stationary field that will retard the runner plate motion down the length of the stator. This drag force must be overcome with a larger main electromagnetic thrust in order to obtain the desired plate acceleration. The additional current demand required to overcome the electromagnetic drag is substantial and is avoided in the present invention—which is especially useful in large linear motor systems such as for aircraft/payload launching.

Figure 5A:
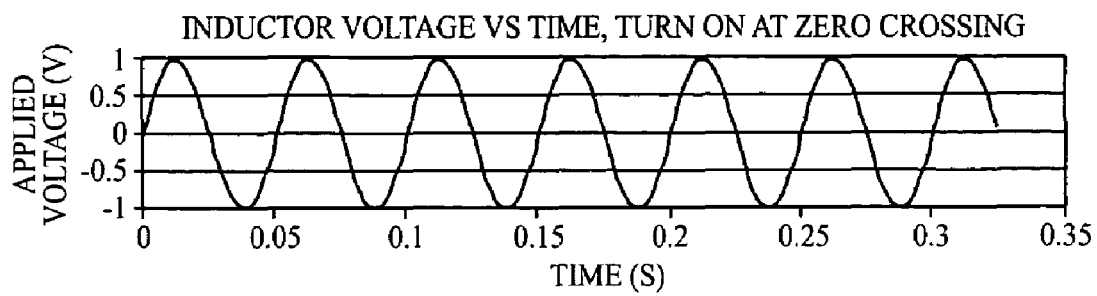
FIG. 5 shows the inductor voltage (5A) and current (5B) response when coil switches are turned on at voltage zero and the inductor voltage (5C) and current (5D) response when coil switches are turned on at voltage peaks.
Figure 5B:
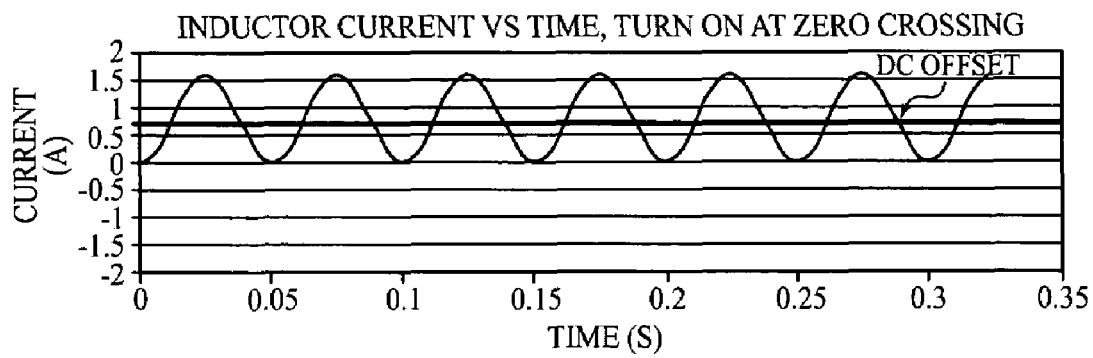
Figure 5C:
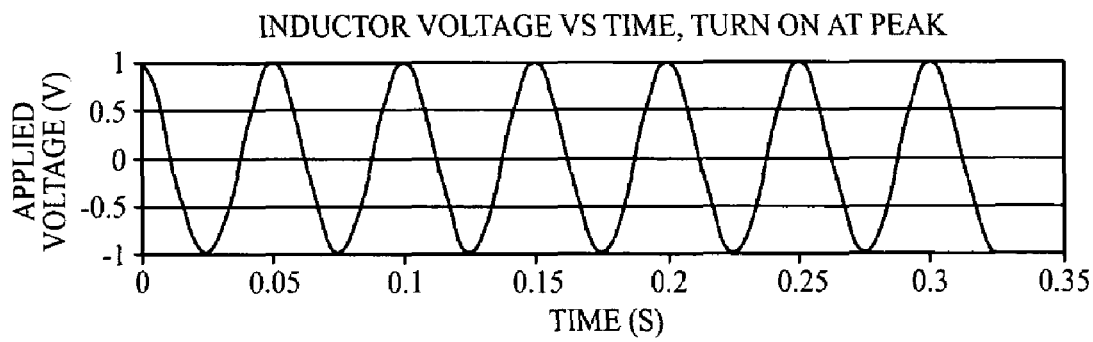

In more detail, the present invention utilizes a switching scheme based on a phasing of the applied voltage in order to limit or eliminate these current transients. The method may be better understood by considering the application of a voltage to a pure inductor as shown in FIG. 5. If the power source voltage is applied to the inductor (simulating an ideal lossless coil) at the exact instant of a positive zero crossing (FIG. 5A) then a large DC offset exists in the current response (FIG. 5B). Of course, the DC offset will decay if a small resistance is added to the circuit.

Figure 5D:
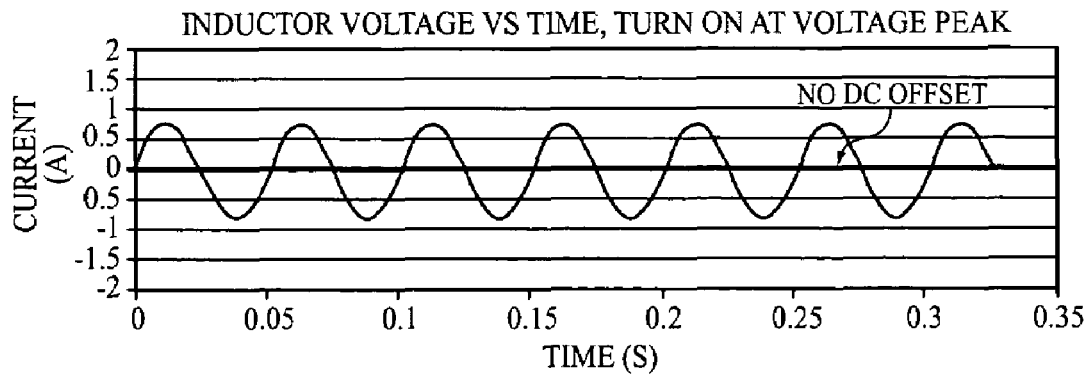

Conversely, if the power source voltage is applied to the inductor at the instant when the voltage is peaking (either positive or negative) (FIG. 5C), then the current responds with no transient DC component (FIG. 5D). That is, the volt-seconds applied until the first voltage zero crossing are exactly enough to drive the flux linkage and current into a steady-state response. This case is identified as "zero phase angle switching" since the applied voltage is a pure cosine function in time with no phase angle. In the case of a pure inductor, zero phase angle switching results in zero current and field transients.

An actual stator coil differs from the idealized inductor in two main respects. First, there is some resistance associated with the copper in the coil windings so the ideal phase angle producing no transient in the response is slightly less than zero. Second, there is a mutual coupling from "preceding" coils that have been previously energized so that the flux linking a coil is not necessarily zero at the instant the coil is turned on. More precisely, the preceding two coils that already are turned on within the active window are strongly coupled to the "next" candidate coil to be turned on. In order to determine the optimal phase angle at which to turn on the coil with no electrical transient, the differential equation of the form $$V - ri = (d\lambda/dt)\lambda(0) = M_{k-1}i_{k-1} + M_{k-2}i_{k-2} \text{ or } \lambda = \int (V - ri) dt + \lambda(0) \quad \text{equation(1)}$$

must be solved for the flux linkage x where $M_{k-1}$ corresponds to the mutual inductance of nearest neighbor coil circuits and $M_{k-2}$ corresponds to mutual inductance between a first coil and a second coil two neighbors away (the second coil away).

The solution to equation (1) for the flux linkage λ requires knowledge of the initial flux λ(0) linking the coil before the coil switch is turned on. One aspect of the present invention is to phase the voltage appropriately so that the volt-seconds added from the power source up to the first zero crossing are just enough when added to the initial winding flux linkage λ(0) so that the sum of the two exactly match the flux linkage associated with a steady-state profile.

Figure 1A:
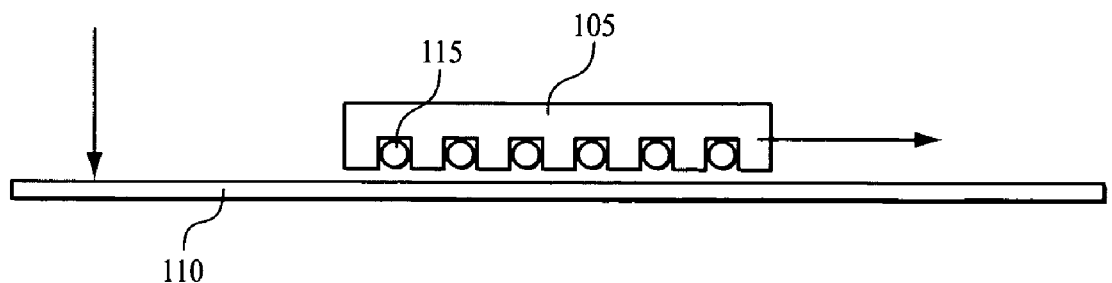
FIG. 1 depicts a single-sided (1A) and double-sided (1B) short primary linear induction motor.
Figure 1B:
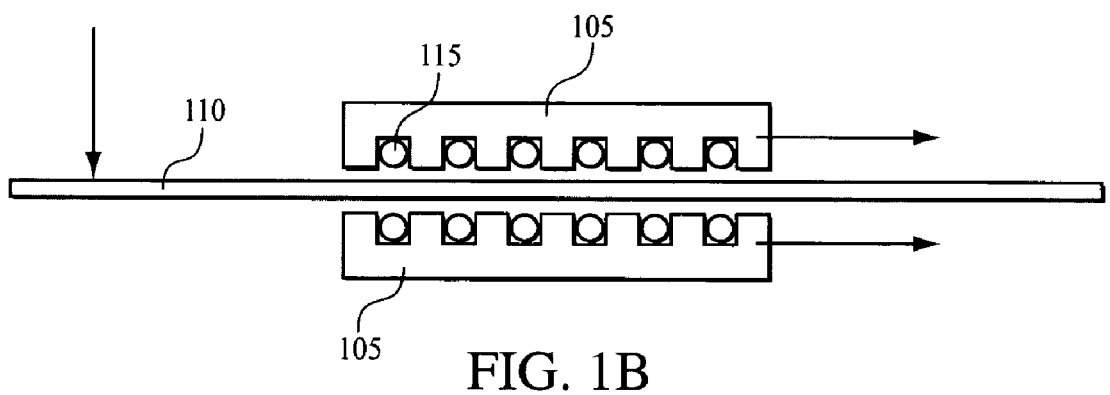
Figure 6:
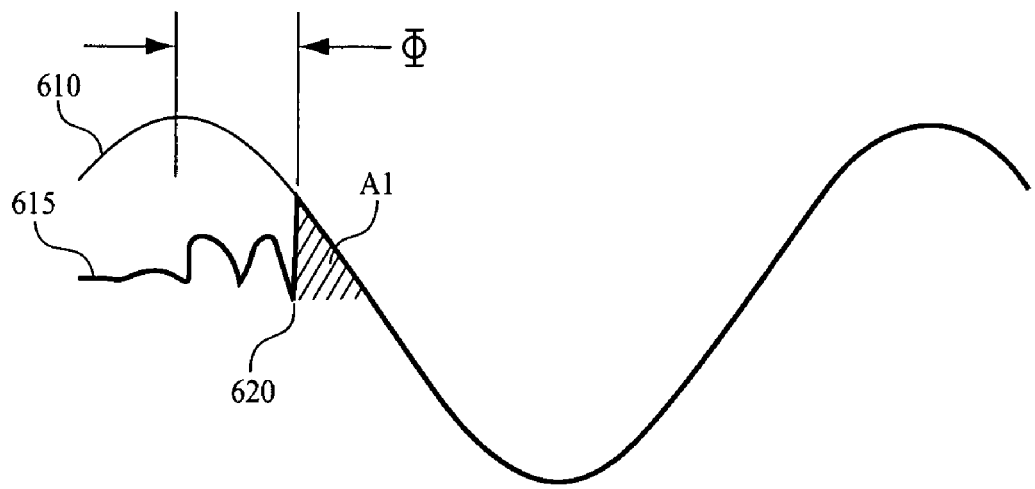
FIG. 6 illustrates the volt-seconds required to drive the flux linkage response directly to steady state.
Figure 2A:
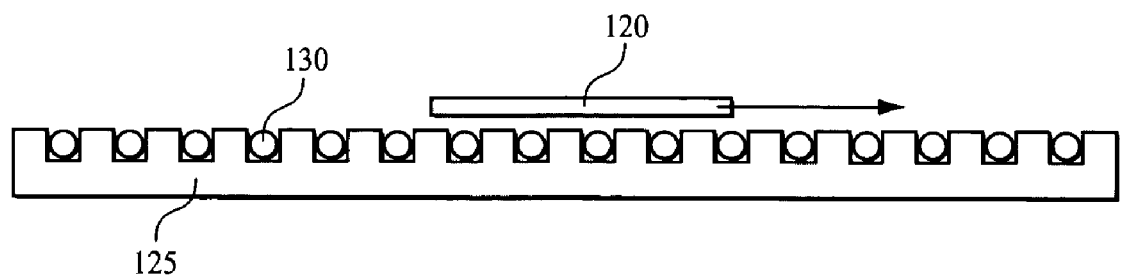
FIG. 2 depicts a single-sided (2A) and double-sided (2B) short secondary linear induction motor.
Figure 2B:
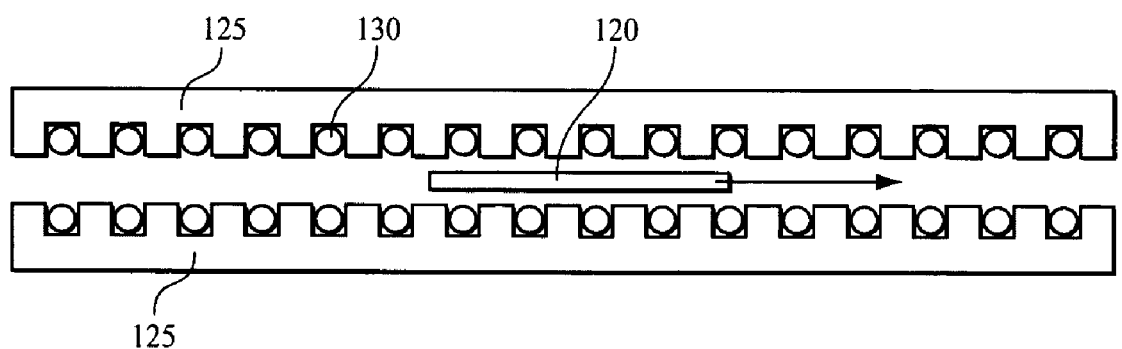
Figure 3:
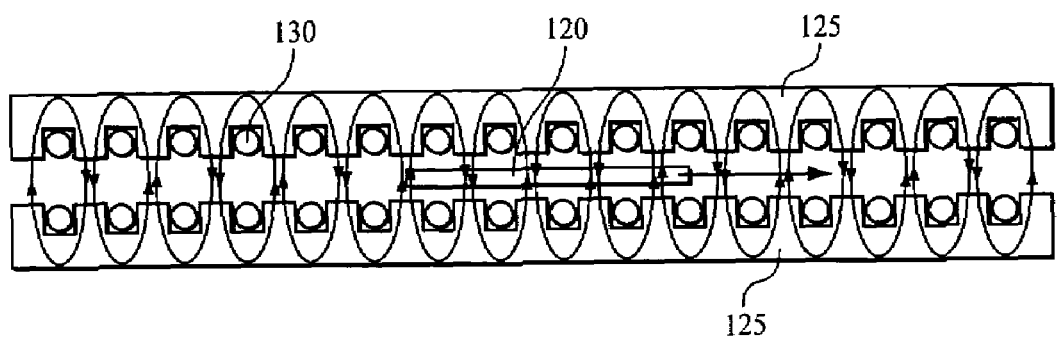
FIG. 3 depicts a short secondary linear motor with the entire stator energized.

This concept is illustrated graphically in FIG. 6 in which the shaded area A1 represents the volt-seconds supplied by the source (less the ir drop) up to the zero crossing. This area A1 can be made larger or smaller by adjusting the precise point in time at which the coil switch is turned on. In FIG. 6, there is shown the power source voltage 610, the coil voltage 615, the point in time at which the coil is witched on 620, and the resultant switching phase angle Φ. The optimal value of the area A1 is such to drive the flux linkage response smoothly into steady state with no overshoot or undershoot. An optimal firing angle (switching angle) Φ occurs every one-half electrical cycle. That is, if a switching request is missed for some reason, another opportunity will occur a half electrical cycle later.

Figure 7A:
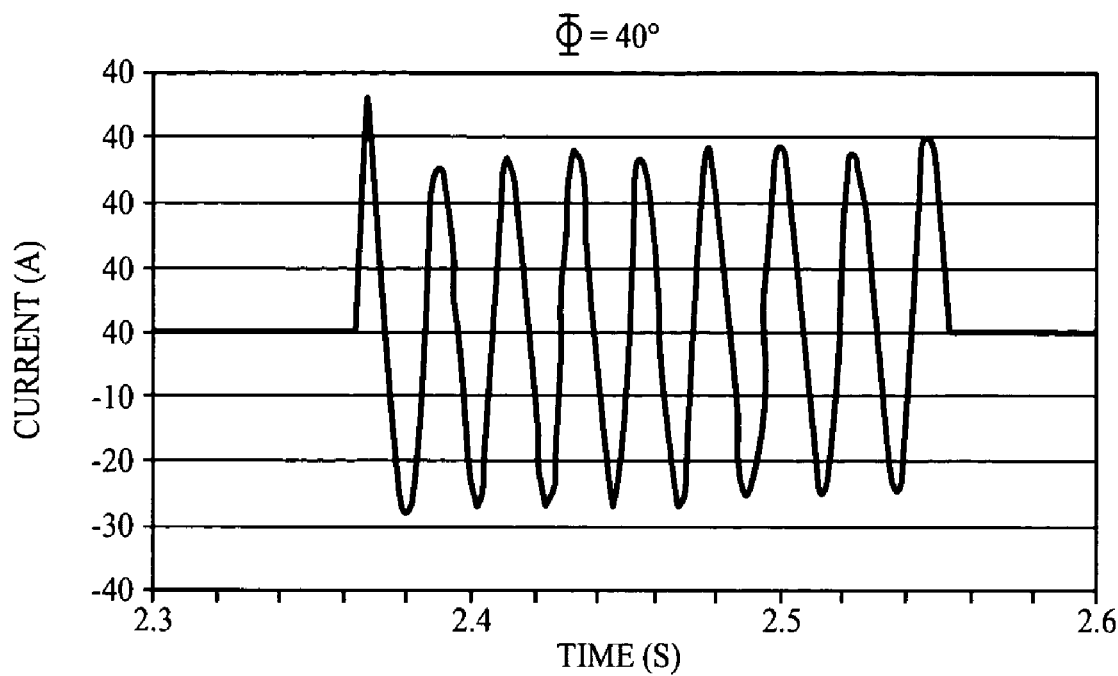
FIG. 7 compares the current response at different voltage application phase angles including 40 degrees (7A) and 130 degrees (7B)
Figure 7B:
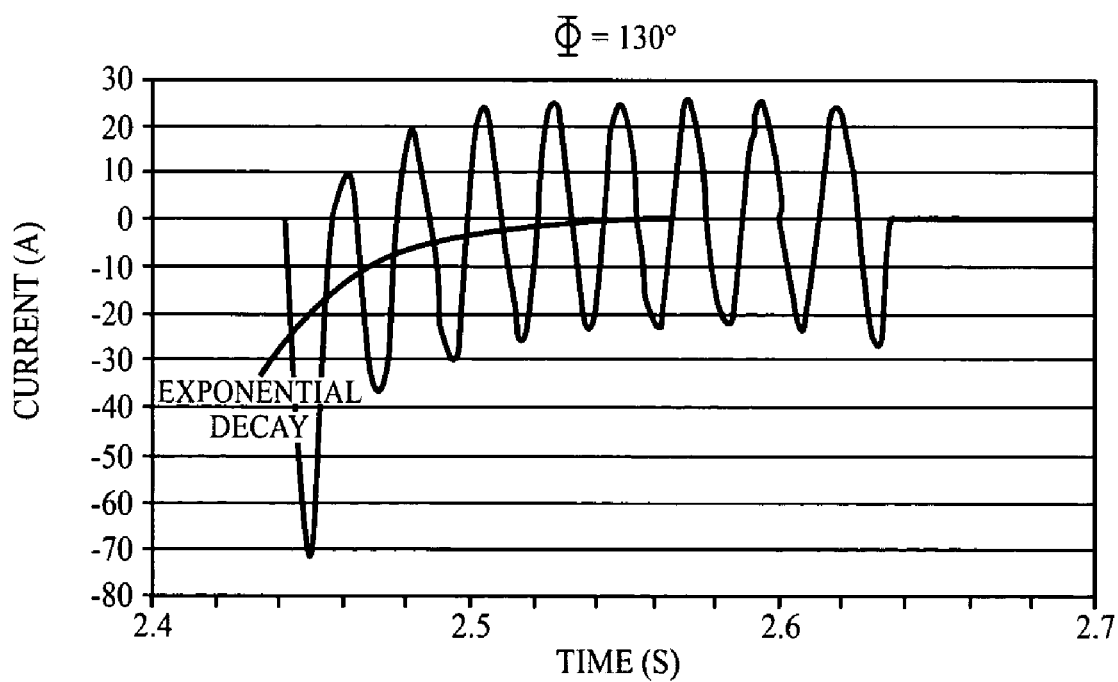

One computer simulation of a linear motor designed to launch aircraft indicates that the optimal phase Φ of the terminal voltage required to eliminate the transient is approximately 40 degrees after the peaking of the power source voltage 610 when accounting for the mutual coupling between coils. Testing of a subscale linear motor designed to launch weighted carts also put the proper angle at about 40 degrees. Exemplary individual coil current waveforms from some tests are illustrated in FIG. 7 for several different coil firing angles including firing angles of 40° (FIG. 7A) and 130° (FIG. 7B). The exponentially decaying current component is clearly evident for the poor switching angle (130° degree switching angle). Additional computer simulations of various other linear motors designed to launch aircraft indicated optimal phase angles of 20–40 degrees depending on variations in coil inductance, mutual coupling, and coil resistance.

The proposed switching scheme requires switching leading and trailing coils one at a time, in sequence, with the progression direction depending upon the direction of runner plate motion (see generally, FIG. 4). As described above, the optimal switching angle Φ that produces no current DC offset occurs every one-half cycle at which time a potential switching event exists. In order for the window to follow the runner plate (rotor), a position sensor (described below) is used to determine if leading or trailing end switching events are required. When a request for leading end switching occurs as a result of runner plate motion, then the switching will initiate at the next opportunity that the voltage phase angle Φ satisfies the principles described above.

The turning off of the coils at the trailing end of the runner plate can be performed nearly instantaneously, as soon as it is requested via the position sensor. There is no need to wait for a certain phase angle because the current will be quickly driven to zero after the switch opens. The "current transient problem" of applying a voltage has no corollary when removing the voltage.

To summarize, in essence, the switching scheme of the present invention considers two distinct aspects in order to decide which switches to engage/disengage at which times to most appropriately power sections of the stator. The position sensing system determines which switches are "eligible" to be turned on based on the position of the rotor, and the processing unit calculates the exact time delay (switching angle), after each peak of the source voltage, for engaging the switch and powering the next leading stator coil. This two step process maximizes the use of the individual coil switching algorithm.

In order to implement coil switching based on the phase of the applied voltage, a signal corresponding to the candidate coil's instantaneous voltage must be available. The overall control of the linear motor runner plate position, velocity and acceleration is most easily performed in terms of rotating reference frame quantities, rather than the physical phase variables. That is, direct and quadrature axis voltages and reference frame angle are the quantities that describe the applied inverter voltages and are readily available. These values can be used to establish the instantaneous phase angle of the bus voltages that are applied to the individual coils. In particular, the relationship between the instantaneous voltage phase angle Φ and the three available voltage quantities ($V_d$, $V_q$, and reference frame angle $\theta_r$) is given by the following equation:

$$\Phi = \theta_r - \tan^{-1}(V_d/V_q) \quad \text{equation(2)}$$

Here Φ represents the instantaneous phase angle associated with the first phase bus (power source) voltage. The processing unit implements this equation in order to establish the phase of the bus voltage. Other bus voltages (second, third, etc. phases) of the polyphase system are derived from the first phase assuming a phase shift of successive phases by 2n/(number of phases). The instantaneous phase angle Φ of any one coil can therefore be evaluated by first determining which phase is driving the coil and then offsetting equation (2) by the appropriate phase shift associated with that particular phase of the polyphase system.

Figure 8:
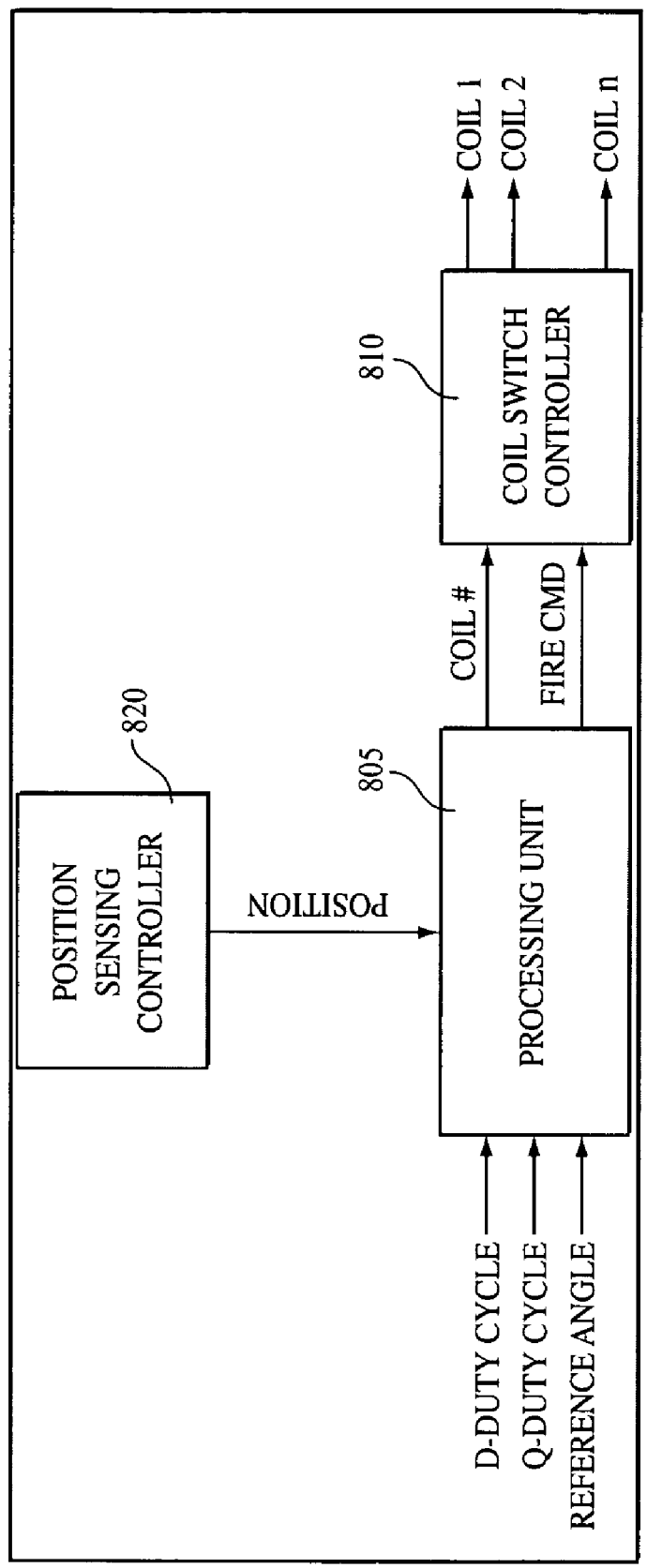
FIG. 8 is a controller block diagram.

One implementation of this coil switching algorithm is shown in block diagram form in FIG. 8. The goal of the processing unit 805 is two-fold: (1) turn-on the "next" coil ahead of the rotor (at the correct phase angle Φ) as it traverses the motor; and (2) turn-off the "last" coil when it is far enough behind the rotor (ignoring phase angle) as it traverses the motor. When the processing unit 805 determines either action is to occur, an action request (including command and coil number) is sent to the coil switch controller 810 to translate that request to a singular command for the given coil.

The processing unit 805 is preferably a digital signal processor (DSP) along with associated memory and control interfaces to allow derived algorithms developed in a high level language to be executed. This unit 805 receives the updated position from the position sensing controller 820. The positive value represents the actual position of the rotor relative to the end positions of the motor. This position is updated at a high-speed rate and has a resolution of, for example, 62.5 micron.

The inputs (D-Duty Cycle, Q-Duty Cycle, and Reference Angle) to the left of the processing unit 805 in FIG. 8 are also received at a very high update rate. The processing unit algorithm is preferably written in such a fashion as to guarantee that it is ready and waiting to receive the next update. When the update is received, the algorithm to determine the fire command is executed. This algorithm contains two primary tasks for determining when the next coil is to be turned on.

The first task is to calculate the offset angle, which is the arc tangent of the 'D' and 'Q' voltage components. This offset angle is added to the reference angle to form a Modulo-180° phase angle. It is the angle that is one of the determining factors for activating a coil. The closer the firing occurs to the desired phase angle results in a lower DC current component. In a three phase system, the wiring to the coils is done by staggering the phases wired to any one coil in a known order. This order is known by the processing unit 805 that adjusts the offset angle to account for the phase connected to the next coil to be fired.

The second task is to regulate the switching on/off of the coils with respect to the position of the rotor (runner) along the motor. This results in a traveling window that moves with the rotor as it travels along the length of the motor. This window includes both a front and back "porch" which are extra coils energized in front and in back of the rotor. The length of the rotor plus the front and back porch constitute the traveling current window. Initially, the window is activated at the location of the rotor. As energy is applied to the motor that causes the rotor to move, the window is adjusted to follow the rotor. The size of this window controls how much current has to be applied to the field. Rather than applying current to the entire motor stator at a significantly increased power rating, the present invention reduces the amount of energy needed to the window portion around the rotor being moved.

Position Sensing

As described above, in order to implement the complex coil switching schemes in large linear motors, position sensing and control must be facilitated to a very high resolution. In an electromagnetic launching system, the rotor is actually a runner or shuttle that travels down the length of a track which is the stator. As the runner "rotor" is accelerated down the track, an attached aircraft or other device is accelerated, for example to flight speed. The present aspect of the invention describes one exemplary position sensing system implemented on the stator track.

In one preferred embodiment of a closed-loop control system for a linear motor, the instantaneous position of the rotor is determined by a position sensing system. Based on the sensed position data, the instantaneous speed of the rotor is calculated and used to adjust the power input to the linear motor (described above). There are many different position sensing technologies available commercially. However, due to the very long motor track length and very high speed motion of the runner plate, only magnetic type and inductive type sensors with "scale" have been determined to be feasible for actual use. For example, an inductive-type technology (such as the INDUCTOSYN technology) may be used as the basis for the position sensor system for an aircraft launcher.

The inductive-type technology relies on the voltage induced between two closed coupled windings (called "scales"), one stationary and one moving, to determine the instantaneous position of the moving part. To increase position sensing resolution and to provide for the ability to determine the moving direction, there are generally two sets of windings on the scale which generate the induced voltages. These two sets of windings are referred to as the "sine" and the "cosine" windings, respectively. These windings are designed to have a 90° phase difference between the winding patterns.

In one preferred embodiment of the aircraft launching application of a linear induction motor system, the moving scale carries the excitation current and the stationary scale carries the induced voltage. The induced voltages of the sine and the cosine windings provide the input data with which an electronic converter system determines the incremental position of the runner plate. In one exemplary embodiment, the moving scale is called the "one-phase tape scale" because a single-phase winding pattern is made on the surface on a steel tape substrate. The stationary scale is referred to as a "two-phase bar scale" because the windings are printed on the surface of steel bars.

The position sensing system also includes a series of Hall-effect sensors for identifying reference (fixed) positional data. Coupling the incremental position data generated by the inductive-type system with the position reference provided by a Hall-effect sensor, the absolute instantaneous position of the runner/shuttle can be accurately and quickly determined. This information can then be sent to the position sensing controller 820 which in turn sends the information to the processing unit 805 as shown in FIG. 8.

For the linear motor system positioning sensor, the excitation current is supplied to the one-phase tape scale through a linear transformer system having a single loop of wire serving as the stationary transformer primary and moving transformer secondary assemblies which move with the runner/shuttle. The coupling between the primary and the secondary of the transformer is preferably made through a circular cavity in the secondary winding assemblies.

For the inductive-type sensor to work, the spacing between the moving and the stationary scale has to be aligned properly, face to face and in close proximity, and the clearance gap (nominally 3 mm, for example) between the two scales has to be maintained to within about 15% of the gap size (i.e., +/−0.5 mm for an aircraft launcher). In large linear induction motor systems, such as an aircraft launching system, enormous forces and very high speeds are involved; it is therefore difficult to maintain gap clearance with close tolerance between the stationary two-phase bar scales and the moving one-phase tape scale if the later is directly attached to the runner/shuttle assembly.

This difficulty is addressed in the present invention by creating a "loosely-coupled mechanism" between the one-phase tape scale and the runner/shuttle assembly. The design of the mechanism is part of the invention to be described in more detail below. This loosely-coupled mechanism not only provides a proper inductive coupling arrangement between the stationary two-phase bar scales and the moving one-phase tape scale, but it also maintains adequate clearance between the primary wire and its secondary winding assembly of the linear transformer.

Further, in linear motor systems which are designed to be operated in wide ambient temperature ranges, thermal expansion can have a significant influence on the accuracy of position sensing, especially if the track length is long, as is the case for aircraft launching. To minimize this potential problem, the position sensor system design preferably incorporates multiple temperature sensors to determine and compensate for the thermal expansion effect.

Figure 9:
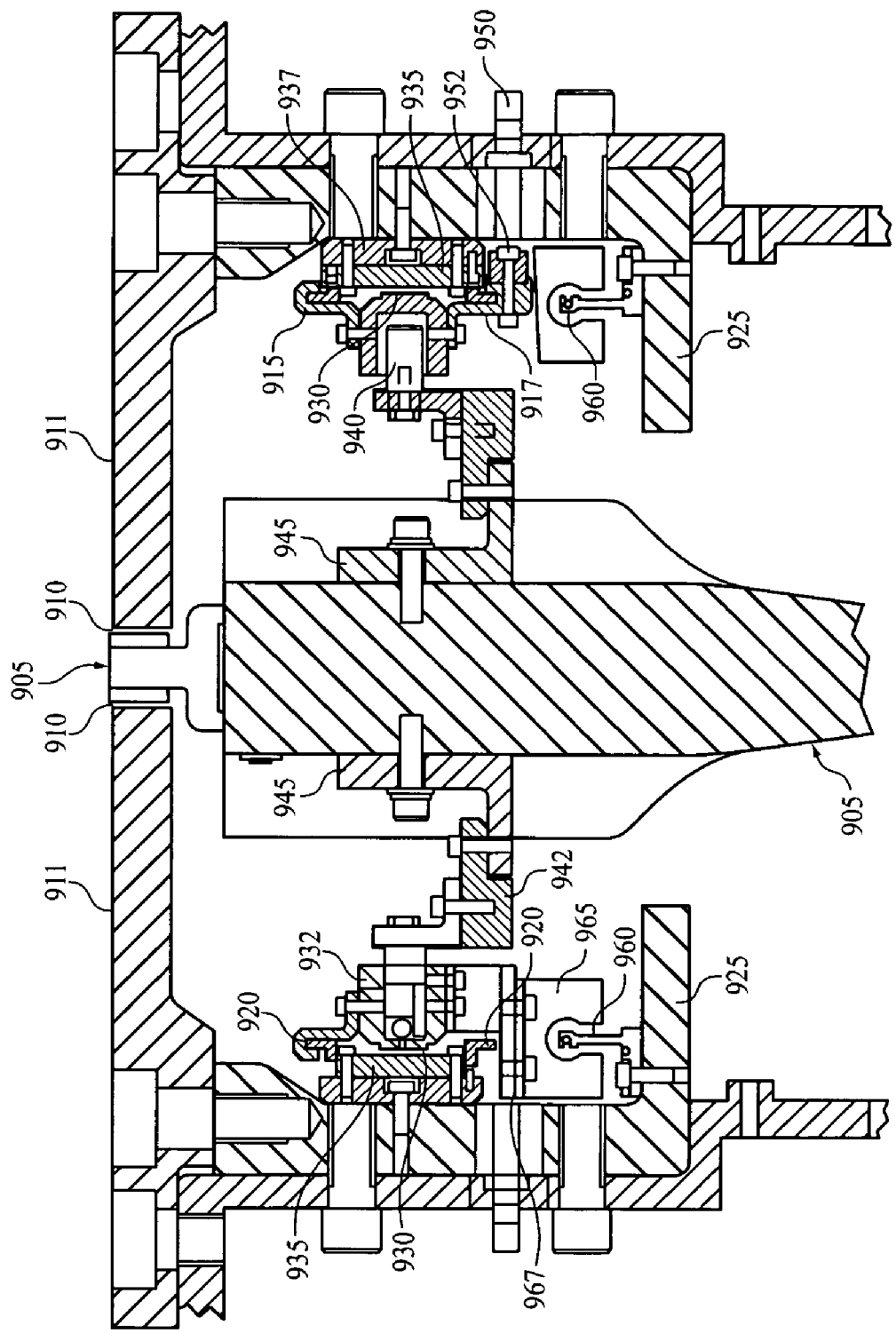
FIG. 9 shows a cross-sectional view of selected aspects of an aircraft launching system including a position sensing subsystem.
Figure 10:
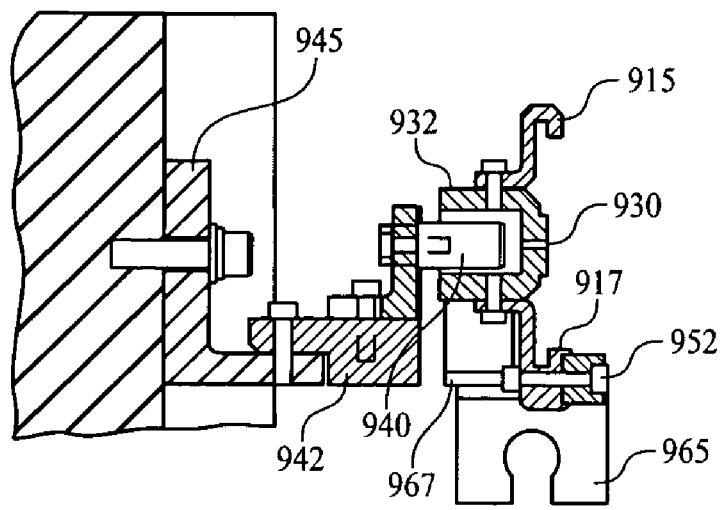
FIG. 10 shows the moving components of a position sensing system in a large linear induction motor.
Figure 11:
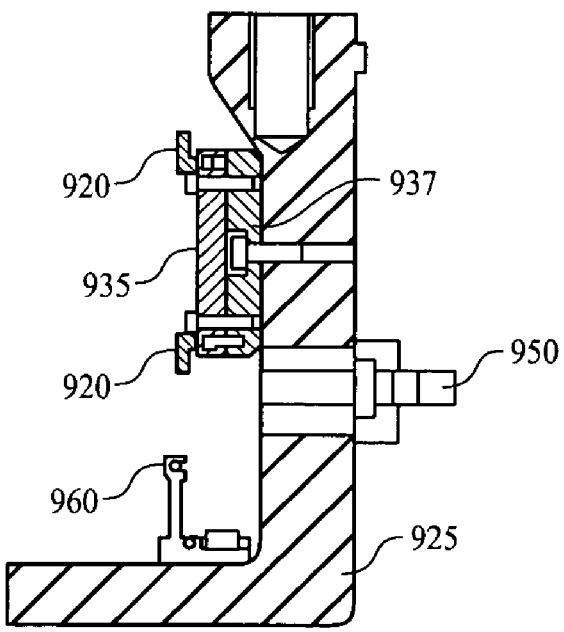
FIG. 11 shows the stationary components of a position sensing system in a large linear induction motor.

The basic structure of a large linear motor system (for example, for launching an aircraft) is shown in FIGS. 9–11. These figures all show cross-sectional views—viewing from the aft end of an aircraft launching system towards the froward end. These views show the device orientation of the position-sensing aspect of the present invention.

FIG. 9 shows the overall cross-sectional layout of the major mechanical position sensor components. The mechanical components of the position sensor are to be installed in the upper guide track area of the linear motor system. Two position sensor systems are shown, one on each side of the runner/shuttle assembly 905. To reveal more components, the sections shown in FIG. 9 are cut at different locations.

The runner/shuttle assembly 905 moves into (and alternatively out of) FIG. 9. At the top of the runner/shuttle assembly 905, there is a gap 910 between the runner/shuttle (which moves) and the trough cover assembly 911 (which is stationary). This trough cover 911 is the deck of the aircraft launcher, and the upper part of the runner/shuttle assembly 905 would be attached to the aircraft.

The runner/shuttle assembly 905 is supported and guided by two pairs of rollers (not shown). For fluid movement of the one-phase tape scale and its attachments (920, 930, 932, 940, 942), the assembly travels on two sliding bearing guides 915, 917 on each side of the runner/shuttle assembly. The bearing guides 915, 917 are slidingly engaged with clamp/guide tracks 920 which run the entire length of the stator track. This bearing/track interface provides for smooth and controlled "running" of the one-phase tape assembly and its attachments down the launch path, propelled by the energized stator coils.

As shown, some of the position sensing components are directly attached to the moving runner/shuttle assembly 905, some components are mounted directly to the stationary L-shaped upper guide rail 925, and others move with the runner/shuttle assembly 905 axially but are only loosely coupled to the runner/shuttle assembly 905.

The one-phase tape scale 930 (which may be about 2 meters long) is preferably mounted on the surface of a support structure 932, while the two-phase bar scales 935 (which may have a total length of about the length of the motor track) are mounted onto a series of mounting bars 937.

The loosely-coupled mechanism, which comprises a cross-arm assembly 940 and a bracket 942, is fixedly attached to the runner/shuttle assembly 905 through a mounting bracket 945 on the one side and loosely engaged (providing some lateral and vertical movement) to the socket of the one-phase tape scale support structure 932.

Through the sliding bearing guides 915, 917 and the clamp/guide tracks 920 that are bolted to the two-phase bar scales 935, the one-phase tape scale 930 and its support structure 932 can travel the entire track length (into and/or out of FIG. 9) while maintaining close spacing tolerance between the two scales 930, 935. Additionally, the matched design between the cross-arm assembly 940 and the socket of the one-phase type scale support structure 932 is such that it permits only a very small tolerance in the axial direction (i.e., the launching direction) but allows relatively large movements in the lateral and the vertical directions as shown by the large gap spacing allocated. The latter movement is the "loosely-coupled" nature of attachment.

A variety of Hall-effect sensors 950 are used to provide fixed positional reference points in the motor system. There are multiple Hall-effect sensors 950 distributed along the length of the track and two actuation magnets 952 on each side of the runner/shuttle assembly 905. As the magnets 952 on the runner/shuttle assembly 905 pass successive Hall-effect sensors 950, fixed reference positioning is determined.

The linear transformer system is also shown in FIG. 9. The linear transformer system consists of the primary wire and its supporting brackets system 960, which run the entire length of the linear motor track, and several transformer secondary winding assemblies 965. Each secondary winding assembly 965 is preferably attached to the one-phase tape scale support structure 932 through a mounting bracket 967. FIG. 9 does not show the tension mechanism for the transformer primary wire that uses a gas spring to maintain the tension of the wire to within a proper tolerance range in various ambient temperature and operating conditions.

Further, thermocouples may be place at locations adjacent to each of the Hall-effect sensors 950, and the temperature at these locations will thereby be continuously monitored. A software program can use the temperature data from the thermocouples to calculate the effects of thermal expansion on the sensor scale and to adjust the position output data accordingly.

FIG. 10 shows the moving position sensor components of a linear motor system. FIG. 11 shows the stationary position sensor components of a linear motor system. For clarity and ease of comprehension, only the right side sensor system is depicted in FIGS. 10 and 11.

This unique position-sensing orientation of the present invention includes several innovative concepts which address problems with existing position sensing systems. For example, this aspect of the present invention combines the application of conventional inductive-type sensor technology for incremental position sensing, distributed Hall-effect sensors for absolute position references and correction, linear transformer technology for supplying excitation power, and distributed temperature sensors for compensation of thermal expansion effects into a large, long-track linear motor system (e.g., for aircraft launching applications). Further, the invention employs a loosely-coupled mechanism to: (a) maintain the proper clearance spacing between inductive-type scales under severe operation conditions; (b) allow sufficient freedom for lateral and vertical movement of the runner/shuttle assembly without sacrificing the ability to accurately track the instantaneous axial motion of the runner/shuttle assembly; and (c) decouple the solid attachment between the secondary winding assembly of the linear transformer and the runner/shuttle assembly to therefore allow the runner/shuttle to travel at high speeds without degrading its coupling configuration or causing any mechanical interference with the primary wire.

Failure Correction Methods

As described above, large linear motor systems include a variety of complicated and varied control algorithms to maximize motor performance. However, along with these complicated stator energizing and position sensing algorithms comes potentially fatal problems. For example, the completion of the launch sequence in aircraft launches and arrests must be assured even while a certain number of component failures are encountered during a launch event. In a conventional, center-slotted linear motor, where each stator coil terminal is energized by a dedicated coil switch to its respective AC voltage bus, a coil switch failure results in magnetic asymmetry. The magnetic asymmetry, in turn, results in lateral forces applied to the running plate of the linear motor which may cause excessive wear, rubbing or buckling of the plate during the launch.

In at least one embodiment, the present invention compensates for this potential failure. A center-slotted linear motor, such as that used in an aircraft launcher, has two sets of stator windings, one set of winding on each side of the motor. In order to provide access to electric power, the stator windings must be accessible at regular intervals. The access points are called coil terminals. There are several hundred coil terminals on each side of such linear motors. A motor has a three (or more) phase AC-current supply bus on each side in order to supply power to the coil terminals. The neutral connection of the motor is left floating. In principle, the linear motor can operate without coil switches or any periodic interconnection of the left and right-side coil terminals along its length.

In order to save expensive power rating and the consequent weight of the variable frequency power conditioning equipment that supplies the AC bus of the linear motor, only a symmetrical fraction of the two stator sides are energized at any given time (i.e., coil switching described above). Therefore, the stator coil terminals must be energized individually by coil switches along each side of the motor.

The length of the energized section or sliding window must be long-enough to include the runner plate of the motor with lead and trail extensions (porches). Essentially, the sliding coil switching window tracks the runner plate of the linear motor. The energization of the sliding window is accomplished by the introduction of stator coil switches along the linear motor (FIG. 4). The advantages of the partial energization of the linear motor via sliding window is described above.

The lead extension sets up the motor flux before the plate enters newly energized windings. Similarly, the trail extension within the sliding window provides orderly turn-off of coil switches that are no longer needed once the plate has passed their location.

The prevention of lateral forces on the runner plate of linear motors is proposed when one or more stator coil switches along the motor fail in either open or closed condition prior to and/or during a launch event. The prevention of lateral forces is accomplished by rearrangement of the described coil switch topology in the following manner.

The left and right-side motor stator sections and coil terminals remain symmetrical with respect to each other as before with independent (single) stator coil switching. The coil terminals are no longer energized independently. Each two corresponding (opposing) coil terminals on the left and right side of the motor become connected together. The joint coil terminals are connected to a single coil switch between the AC power bus and the joint terminals. Note that, on one hand, the number of the coil switches has been reduced by half. On the other hand, the current rating of the coil switch now supplying two stator windings has doubled. However, the cost of the higher-current switch is estimated to be only 33 percent higher than that of the former single-terminal switch. In this way, opposing coil sections are paired, and lateral forces are eliminated in the case of switch failure.

In addition to the prevention of lateral forces on the runner plate by making all coil switch failures symmetrical failures, this technique allows weight, size and cost savings via the reduction of the number of coil switches, fusing, snubber and gate drive circuits to one half of the number of the stator coil terminals.

Furthermore, one of the AC buses could also be eliminated, and all coil switches could be placed on only one side of the linear motor. The single-side arrangement would save shipboard weight and volume (if the launcher was part of an aircraft carrier) and would provide fast, single-side deck access for coil switch replacement.

This optional coil switching algorithm addresses several deficiencies in prior systems. For example, the invention eliminates lateral forces on the runner plate of linear motors by inter-connecting corresponding left and right-side coil switch terminals and energizing the joint terminals with a single coil switch. The invention reduces the number of coil switches necessary by half as a result of the above interconnection of two coil terminals. The optional embodiment cross-connects the left and right-side coil terminals making the elimination of the dual-sided AC bus structure possible. This allows the placement of all coil switches on one side of the motor without increasing the number of the cross-connections. This results in enhanced accessibility and replacement of coil switches in the tight shipboard environment.

Aircraft Launcher

As described above, the concepts of the present invention are uniquely adaptable to an aircraft launching system. In one exemplary embodiment, the system components shown in FIG. 9 would comprise the upper portion of the electromagnetic aircraft launching system. The support structure and the actual stator coils are not shown in the this figure.

Looking at FIG. 9, the runner/shuttle assembly 905 and the trough cover 911 would guide the aircraft along the upper surface or deck of a launching site. This system would exist in a cut-away or trough in the actual deck of the ship or launching area. The broken lines at the lower right and left of the figure are extended down below into a girder network or other steel structure (in the deck trough) that supports the other components of the linear motor and launcher system.

The lower portion of the runner/shuttle assembly 905 (lower middle of FIG. 9) would be extended below the depicted components in between the two sides of a double-sided stator coil. These individually switched stator coils would run the length of the launching system (the runway). At the very bottom tip of the runner/shuttle assembly 905 exists a channel or other guide to make sure that the runner/shuttle assembly is properly oriented as it travels down the length of the runway. Many alternative configurations and orientations of such an electromagnetic aircraft launching system are evident to those skilled in the art within the scope of the present invention.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A linear motor control system, comprising:
   a stator including a plurality of individually switched stator coils;
   a moving rotor adapted to move down a long axis of the stator;
   an inductive-based position sensing system with first components attached to said rotor and second components attached to said stator;

calculation means for determining, based on sensed position data, a proper voltage time delay angle with respect to a voltage source peak voltage for applying current to a next leading coil of said stator coils such that the current in said next coil is at its steady state value immediately after switching.

2. The linear motor control system of claim 1, wherein said first components include a one-phase tape scale.

3. The linear motor control system of claim 2, wherein said second components include a two-phase bar scale.

4. The linear motor control system of claim 3, wherein said one-phase tape scale is loosely coupled to said moving rotor.

5. The linear motor control system of claim 4, wherein the position sensing system maintains no more than a 15% distance tolerance between the one-phase tape scale coupled to the moving rotor and the two-phase bar scale coupled to the stator as the one-phase tape scale moves past the two-phase bar scale down the long axis of the stator.

6. The linear motor control system of claim 1, wherein said position sensing system further includes a plurality of Hall-effect sensors for absolute positioning.

7. The linear motor control system of claim 1, further comprising:
a plurality of temperature sensors located down the long axis of the stator to sense local operating temperatures.

8. The linear motor control system of claim 1, wherein the stator is double-sided, with independently switched stator coils on each side.

9. The linear motor control system of claim 8, wherein individually switched stator coils are turned on and off in pairs, with a single switch turning on a pair of coils, one on each side of the double-sided stator.

10. The linear motor control system of claim 1, wherein said calculation means determines the voltage time delay angle with respect to the voltage source peak voltage based on the flux linkage of said next leading coil before switching.

11. The linear motor control system of claim 1, wherein said calculation means includes a processing unit with a digital signal processor to calculate the voltage time delay angle with respect to the voltage source peak voltage.

12. The linear motor control system of claim 11, wherein said calculation means includes a coil switch controller for providing commands for the individually switched coils to turn on and off.

13. A method for controlling the application of power to a series of stator coils in a linear motor, comprising the steps of:

sensing the instantaneous position of a moving rotor with respect to the stationary stator coils using an inductive sensor;

calculating, based on the sensed rotor position, a source voltage phase shift for a next one of said stator coils in the moving direction of the rotor that results in a current in the next one of said stator coils moving immediately to a steady state value;

applying source voltage to said next stator coil at said calculated phase shift.

14. The method of claim 13, further comprising the step of:
removing an applied source voltage from a previous stator coil that is located behind the moving direction of the rotor.

15. The method of claim 13, wherein said inductive sensor is a two-piece inductive-type sensor and a series of Hall-effect sensors.

16. The method of claim 15, wherein said inductive-type sensor includes a one-phase tape scale loosely coupled to said rotor.

17. The method of claim 16, wherein said inductive-type sensor includes a two-phase bar scale attached to said stator.

18. The method of claim 13, wherein said stator is a double-sided stator, and in said applying step, the voltage is applied to a pair of individual stator coils, one on each side of the double-sided stator at the same time.

19. The method of claim 13, wherein said calculation step is based on the flux linkage of said next coil before said applying step.

20. An electromagnetic aircraft launching system, comprising:
a double-sided stator assembly including a plurality of individually switched stator coils;
a moving rotor assembly adapted to move down a long axis of the stator and further adapted to engage an aircraft;
an inductive-based position sensing system with first components loosely coupled to said rotor assembly and second components attached to said stator assembly;
a processing unit including a digital signal processor for determining, based on sensed position data, a proper voltage time delay angle with respect to a voltage source peak voltage for applying current to a next leading coil of said stator coils such that a DC offset component of the current supplied to said next leading coil is removed.

* * * * *